United States Patent
Bhuyan et al.

(10) Patent No.: US 11,436,852 B2
(45) Date of Patent: Sep. 6, 2022

(54) DOCUMENT INFORMATION EXTRACTION FOR COMPUTER MANIPULATION

(71) Applicant: Intuit Inc., Mountain View, CA (US)

(72) Inventors: Ranadeep Bhuyan, Bangalore (IN); Shubhajit Saha, Karnataka (IN); Sudipto Ghosh, Karnataka (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/941,349

(22) Filed: Jul. 28, 2020

(65) Prior Publication Data

US 2022/0036063 A1 Feb. 3, 2022

(51) Int. Cl.
| | |
|---|---|
| *G06K 9/00* | (2022.01) |
| *G06V 30/416* | (2022.01) |
| *G06K 9/62* | (2022.01) |
| *G06T 11/60* | (2006.01) |
| *G06T 7/11* | (2017.01) |
| *G06V 10/75* | (2022.01) |
| *G06V 30/10* | (2022.01) |

(52) U.S. Cl.
CPC .......... *G06V 30/416* (2022.01); *G06K 9/6223* (2013.01); *G06T 7/11* (2017.01); *G06T 11/60* (2013.01); *G06V 10/751* (2022.01); *G06T 2207/30176* (2013.01); *G06V 30/10* (2022.01)

(58) Field of Classification Search
CPC ........... G06K 9/00469; G06K 9/00483; G06K 9/00442; G06K 9/00463; G06K 9/6202; G06K 2209/01; G06T 2207/30176
See application file for complete search history.

(56) References Cited

U.S. PATENT DOCUMENTS

| | | | | |
|---|---|---|---|---|
| 7,661,102 B2 * | 2/2010 | Ogle | ........................ | G06F 8/658 717/168 |
| 9,031,305 B2 * | 5/2015 | Nakamura | ........... | G06K 9/6278 382/133 |
| 2004/0220898 A1 * | 11/2004 | Eguchi | ................ | G06F 16/5854 |
| 2007/0030519 A1 * | 2/2007 | Tojo | ........................ | G06F 16/50 358/1.18 |
| 2008/0244378 A1 * | 10/2008 | Chen | ................... | G06K 9/00456 715/226 |
| 2009/0110288 A1 * | 4/2009 | Fujiwara | ............ | G06K 9/00463 382/190 |
| 2019/0087962 A1 * | 3/2019 | Hayashi | .................. | H04N 1/387 |
| 2019/0164313 A1 * | 5/2019 | Ma | ........................ | G06V 10/762 |
| 2020/0074169 A1 * | 3/2020 | Mukhopadhyay | ..... | G06Q 50/18 |

* cited by examiner

*Primary Examiner* — Oneal R Mistry
(74) *Attorney, Agent, or Firm* — Paradice and Li LLP

(57) ABSTRACT

Systems and apparatuses are disclosed for extracting information from document images. An example method includes segmenting a document image into multiple segments and determining formatting information for each segment. Determining formatting information for a segment includes determining one or more features of the segment and comparing the one or more features of the segment to one or more clusters of features associated with different document types. The formatting information for the segment is based on the comparison. The method also includes, for each segment, storing the formatting information in a data structure associated with the segment. The method further includes, for each segment including text to be identified during information extraction, applying OCR to the segment to generate machine-encoded text and storing the machine-encoded text in the associated data structure.

15 Claims, 7 Drawing Sheets

400

Determine a first group of pixels with non-zero contrasts and based on proximity between the first group of pixels. 402

Pixels with non-zero contrasts are within a threshold pixel distance of one another. 404

Determine a second group of pixels with non-zero contrasts and based on proximity between the second group of pixels. 406

Pixels with non-zero contrasts are within a threshold pixel distance of one another. 408

The first group and the second group are separated by a pixel distance. 410

Associate a first area of the document image including the first group of pixels and not including the second group of pixels with a first segment. 412

Associate a second area of the document image including the second group of pixels and not including the first group of pixels with a second segment. 414

Figure 4

DOCUMENT INFORMATION EXTRACTION FOR COMPUTER MANIPULATION

TECHNICAL FIELD

This disclosure relates generally to document manipulation, and more particularly to information extraction from documents for computer manipulation.

DESCRIPTION OF RELATED ART

Data entry from physical documents into electronic information is important in many computer operations. As such, some computer systems ingest physical documents and convert the documents' text into computer manipulable information. For example, a physical document is scanned and converted into an electronic image (such as in a Joint Photographic Experts Group (jpeg) format, portable network graphics (png) format, or another suitable image format). Optical character recognition (OCR) is then performed on the image to identify text characters in the image and generate machine-encoded text from the identified text. In this manner, text from a physical document may be converted to machine-encoded text for manipulation. Natural language processing (NLP) is then applied to identify words, sentences, and other text structures. However, the computer system performing OCR does not extract other information from documents, including document layout (such as location of text in the document, number of different locations of text in the document, and so on) and font style (such as the text formatting and size in terms of the machine-encoded text). Since the computer system only generates machine-encoded text via OCR, the computer system is unable to generate an electronic document that mimics the physical document from the machine-encoded text.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for extracting information from a document image for computer manipulation. An example method includes segmenting a document image into multiple segments and determining formatting information for each segment. Determining formatting information for a segment includes determining one or more features of the segment and comparing the one or more features of the segment to one or more clusters of features associated with different document types. The formatting information for the segment is based on the comparison. The method also includes, for each segment, storing the formatting information in a data structure associated with the segment. The method further includes, for each segment including text to be identified during information extraction, applying OCR to the segment to generate machine-encoded text and storing the machine-encoded text in the associated data structure.

The method may also include generating a copy document image from the one or more data structures, comparing the document image and the copy document image, and adjusting the determination of formatting information. The method may further include iteratively determining new formatting information for the document image based on the adjustment, generating a new copy document image based on the new formatting information, and comparing the new copy document image to the document image until the copy document image satisfactorily resembles the original document image.

Another innovative aspect of the subject matter described in this disclosure can be implemented as an apparatus for extracting information from a document image for computer manipulation. An example apparatus includes one or more processors and a memory storing instructions for execution by the one or more processors. Execution of the instructions causes the apparatus to segment a document image into multiple segments and determine formatting information for each segment. Determining formatting information for a segment includes determining one or more features of the segment and comparing the one or more features of the segment to one or more clusters of features associated with different document types. The formatting information for the segment is based on the comparison. Execution of the instructions also causes the apparatus to store, for each segment, the formatting information in a data structure associated with the segment. Execution of the instructions also causes the apparatus to, for each segment including text to be identified during information extraction, apply optical character recognition to the segment to generate machine-encoded text and store the machine-encoded text in the associated data structure.

Another innovative aspect of the subject matter described in this disclosure can be implemented as a non-transitory computer-readable storage medium storing instructions for execution by one or more processors of an apparatus to extract information from a document image for computer manipulation. Execution of the instructions causes the apparatus to segment a document image into multiple segments and determine formatting information for each segment. Determining formatting information for a segment includes determining one or more features of the segment and comparing the one or more features of the segment to one or more clusters of features associated with different document types. The formatting information for the segment is based on the comparison. Execution of the instructions also causes the apparatus to store, for each segment, the formatting information in a data structure associated with the segment. Execution of the instructions also causes the apparatus to, for each segment including text to be identified during information extraction, apply optical character recognition to the segment to generate machine-encoded text and store the machine-encoded text in the associated data structure.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

FIG. 4 shows an illustrative flow chart depicting an example operation for segmenting a document image.

DETAILED DESCRIPTION

Figure 1:
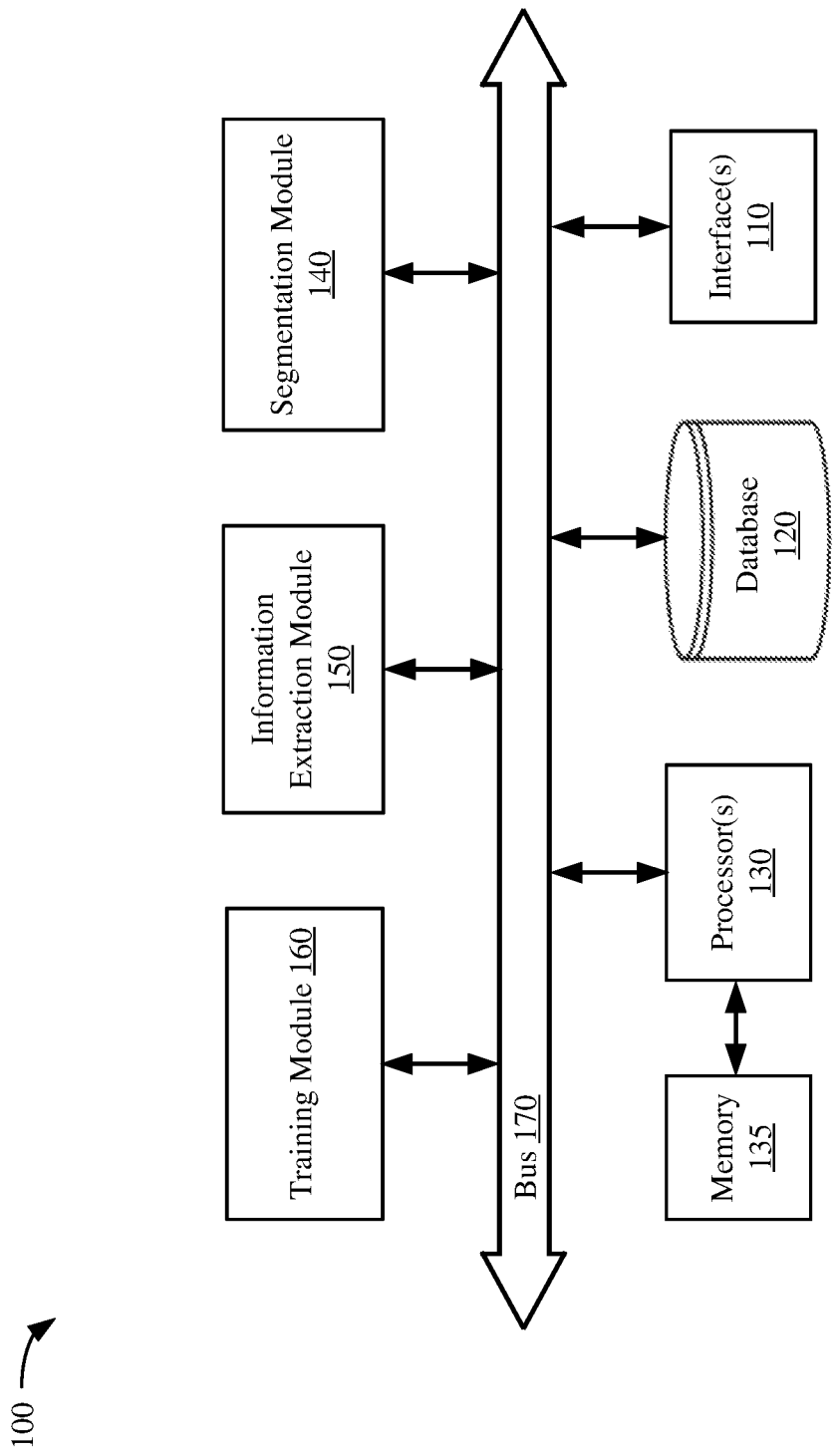
FIG. 1 shows an example extraction apparatus, according to some implementations.

A computer system performing conventional information extraction from a document includes OCRing the document to generate machine-encoded text (which is a string of characters including punctuation and spaces). NLP is applied to the character string to identify words, sentences, and other information from the machine-encoded text. While natural language information may be determined from the machine-encoded text, the machine-encoded text does not include information regarding font size, typeface, whether the text is italicized or bolded, or other font style information. The machine-encoded text also does not include information regarding the location of text in the document, whether text is separated into different locations in a document, the formatting of the text (such as whether the text is aligned or indented, or whether lines of text are spaced from one another), or other document layout information.

Implementations of the subject matter described in this disclosure can be used for extracting information from documents that conventional OCR techniques fail to provide. For example, extracted information may include font style information and document layout information to indicate where text is located in a document, how text appears in the document, and other document information. The computer system may store enhanced data structures as compared to machine-encoded text (even after NLP, which may be stored as JavaScript Object Notation (JSON) strings), and the enhanced data structures enable the computer system with additional capabilities for manipulating documents and document information. For example, extracted information from a document that is not limited to natural language information allows for a computer system to reconstruct an electronic document from the extracted information (which is not enabled by machine-encoded text from OCR alone). In this way, machine-encoded content generated from a document may be manipulated, and the manipulated content may be used to reconstruct the document with the altered information. The additional machine-encoded content may also be used to group information from different documents based on type of documents, origin of documents, and so on by comparing extracted document layout information. The additional machine-encoded content may further be used to map identified text to specific portions of a document. For example, a document including multiple fields/components/segments may include text for each field. The additional information about document layout and font style may be used to map text to specific fields. A field may be associated with different data types, such as user/customer information (name, postal address, phone number, e-mail address, and so on), monetary values (such as costs with or without taxes or charges), number of units, provider information (name, postal address, phone number, e-mail address, and so on), terms and conditions, notices or informational statements, and so on. Mapping text to a field may include associating the text with a specific data type to allow for manipulation of similar data types across multiple documents. The additional information (such as layout, font style, or other visual features of a component) is formatting information of the document image.

In determining formatting information of at least portions of a document image, one or more components of other document images previously analyzed include component features that are determined and clustered. Each document type (such as an invoice from a specific vendor, a specific type of tax form, a specific schedule for a tax form, or other suitable documents) is associated with one or more clusters of component features (with a component of the document image associated with a cluster of component features). A document image to be processed is segmented into components, and component features are determined for one or more of the components. The features for the components may be compared to the clusters of component features for one or more document types, and the document type with clusters closest to the features of the components for the document image may be identified as the document type of the document image being processed. The matched document type may thus indicate at least some formatting information for the document image (such as based on the component types of the different components based on the clustering or based on the document type). In using clusters (or clusterings) to determine at least some formatting information for a document image, the formatting information for the document image may be better defined than if analyzing the document image on its own.

In a specific example, an invoice is to be ingested and managed by a computer system executing an accounting program. If the accounting program enables the computer system to extract information additional to what is extracted via OCR alone (such as via clustering or otherwise determining formatting information), the computer system may be able to generate a receipt in the same style as the invoice. In addition, an altered invoice may be generated based on adjusting values in the enhanced data structures (generated from the invoice) and reconstructing the invoice based on the adjusted data structures. Generating the new document with a similar style or formatting may be based on a brute force method of generating the document and adjusting the formatting information for the document until the new document and the original document satisfactorily match. In some other examples, generating the new document may be based on a generative adversarial network to create a plurality of new documents and select the document best matching the original document.

Furthermore, document layout information may be compared between invoices to recognize invoices originating from the same firm. Additionally, document layout information may be used to identify text for different fields of an invoice (including address, line items, tax, totals, pay to accounts, and so on). In this manner, total amounts due across all invoices, to whom payments are to be provided, and so on may be tabulated with better accuracy than attempting to identify data types based on machine-encoded text from OCR alone.

As indicated in the examples above and will be evident in the present disclosure, various aspects of the present disclosure provide a unique computing solution to a unique computing problem that did not exist prior to information extraction from documents for computer manipulation. Implementations of the subject matter disclosed herein provide meaningful improvements to document ingestion, processing, and storage by a computer system by allowing for more detailed and accurate accounting of document features for manipulation, thus improving computer functionality and operation. As such, implementations of the subject matter disclosed herein are not an abstract idea such as organizing human activity or a mental process that can be performed in the human mind, much less using pen and paper.

Moreover, various aspects of the present disclosure affect an improvement in the technical field of information extraction from documents into machine-encoded information. Whereas conventional techniques for information extraction only used OCR and NLP to determine natural language information from a document stored in machine code, the described methods (including techniques for extracting and storing additional information from documents) provides improvements in physical document manipulation by a computer system (including generating new documents based on extracted formatting or mapping information to specific fields or data types).

FIG. 1 shows an example extraction apparatus 100, according to some implementations. Various aspects of the extraction apparatus 100 disclosed herein are applicable to extracting and storing content from documents that is more than just a character string based on OCR. For example, the extraction apparatus 100 can determine document layout or font style information to be stored and used in managing the document content. Such additional information may be referred to as formatting information.

The extraction apparatus 100 is shown to include one or more input/output (I/O) interfaces 110, a database 120, one or more processors 130, a memory 135 coupled to the one or more processors 130, a segmentation module 140, an information extraction module 150, and a training module 160. In some implementations, the various components of the extraction apparatus 100 can be interconnected by at least a data bus 170, as depicted in the example of FIG. 1. In other implementations, the various components of the extraction apparatus 100 can be interconnected using other suitable signal routing resources.

The apparatus 100 may be any suitable device or system for performing aspects of the present disclosure. For example, the apparatus 100 may be a computer, computing system, interconnected system of multiple computing devices, or a distributed computing system. As such, the apparatus 100 may be one or multiple devices. Modules, as used herein, may refer to software executed by the one or more processors 130 (such as in one or more computer applications stored in memory 135), hardware implemented in the apparatus 100 (such as one or more application specific integrated circuits (ASICs), or a combination of hardware and software. In this manner, while the modules 140-160 are shown as separate from the one or more processors 130 and memory 135, one or more of the modules may be implemented at least in part in software stored in the memory 135 and executed by the one or more processors 130.

The extraction apparatus 100 determines formatting information (such as graphics, font styles, locations of text or graphics, and other document formatting information) and generates machine-encoded text (such as via OCR). In this manner, a document's style as well as the text content is extracted. To determine formatting information and text content, the apparatus 100 receives a document image via one or more interfaces 110, segments the document image using the segmentation module 140, determines formatting information in each segment and generates machine-encoded text for one or more segments using the information extraction module 150, and stores the determined information and machine-encoded text into one or more data structures (such as in memory 135 or the database 120). The apparatus 100 is also configured to adjust determining formatting information (using the training module 160) in order to improve the accuracy of the extracted information in representing the document image.

As noted above, the one or more I/O interfaces 110 include an interface to receive a document image. A document image is an electronic image of a physical document (such as a jpeg or portable document format (pdf) image of a document). The document may be of any matter, including financial documents (such as tax forms, invoices, receipts, and so on). In some implementations, the interface is to an optical scanner, camera, or other image capture device for scanning a physical document. In this manner, the apparatus 100 receives a document image scanned by the image capture device via the interface. In addition or to the alternative, the interface is to another computing device (such as via an ethernet, wireless, or other suitable wired or wireless connection to a remote computer or server) to receive the document image stored on the computing device.

The database 120, which represents any suitable number of databases, can store any suitable information for information extraction from a document image or for training the determination of formatting information during extraction. Example information stored in the database 120 includes templates of different types or versions of document images that may be processed by the apparatus 100 during information extraction. In some implementations, the apparatus is configured to ingest document images for financial transactions, including invoices, receipts, and tax forms. With the number of vendors and number of tax forms being finite, the types and versions of documents to be processed by the apparatus 100 is finite. For example, a user may receive invoices from 10 vendors, and the user is to provide 20 different tax documents in completing tax returns. Each vendor provides invoices with a unique formatting, and each tax document is provided by the appropriate tax authority with a unique formatting. Therefore, the apparatus 100 is configured to receive at least 30 different documents with a unique formatting from one another.

The database 120 includes a template for each unique document image type or version to be processed by the apparatus 100. As used herein, a template includes one or more formatting rules (such as rules regarding positions of components in a document image and/or rules regarding a style of the component or text formatting). The templates are used by the apparatus 100 to identify a specific type of document being processed (such as determining whether the formatting rules are met by the specific document image). Matching a template to a document image may aid in identifying different portions of the document image or identifying formatting information of the document image. In some implementations, a template maps to one or more data structures including formatting information for the document type. Such formatting information can be leveraged for processing a matched document image. The apparatus 100 can also generate a new template for a document image that does not conform to any of the stored templates (such as no set of rules for the plurality of templates being sufficiently satisfied by the document image).

As noted above, a data structure includes formatting information for at least a portion of a document image. Example formatting information includes one or more of specific graphics or logos, shapes, shading, text alignment, font style, font size, indentation, line spacing, or a location of a specific graphic, shape, or text in the document image. Formatting information may also include color information, such as hue, text color, shape color, number of hues in a segment, and so on. In some implementations, the formatting information is specific to a segment of the document image. In this manner, the document image being processed is associated with a set of one or more data structures.

As used herein, formatting information includes (i) a position of a component (which may also be referred to as a location of a segment) and (ii) one or more entities. An entity is a feature or variable of the formatting information. An example entity includes a metadata-template (M-T) corresponding to formatting information that may correspond to a specific template (such as information regarding vertical lines in the type of document image, horizontal layout of components for the type of document image, image holder information (such as location, size, and position for inserting a stored graphic), and text labels for specific portions of text in a segment). Another example entity includes a namelist. A namelist includes information regarding a font style for a segment, font color, alignment, or other text formatting. Another example entity includes metadata (not from the M-T). Example metadata includes labels of components or segments, such as column names in a table. The metadata may thus indicate the type of information included in a portion of the document image, such as including labels for columns (or rows or other segmentations) of "date," "customer name," "e-mail," "address" or "address line," and so on. While three example entities are provided any suitable number and format of entities to indicate formatting information may be used. Each document image corresponds to the positions of the components (such as lines in segments or segments in the document image) and the entities (such as the three example entities described above) in addition to the machine-encoded text (described below). The entities and positions may be stored in one or more cascading style sheets (CSSs), and the CSSs, along with the machine-encoded text, may be used to reproduce the document image from scratch. The CSSs are stored in the one or more data structures corresponding to the specific document image.

An example data structure may also include text content. For example, the apparatus 100 converts text from a portion of the document image to machine-encoded text using OCR. The machine-encoded text may be a string of characters as recognized in scanning the portion of the document image. The apparatus 100 can also apply NLP to the machine-encoded text to further process the text content. The data structure may thus be configured to store both formatting information and machine-encoded text. In some implementations, the data structure includes formatting information in one or more CSSs. In this manner, the formatting information may be encoded in a hypertext markup language (HTML) format. The data structure may also include the machine-encoded text in JavaScript Object Notation (JSON) separate from the one or more CSSs. For example, the machine-encoded text is stored as key-value pairs for manipulation using NLP. In some implementations, a set of key-value pairs across the entire document image is associated with multiple sections or components of the document image. The set of key-value pairs may be divided or structured to indicate which key-value pairs of the set are associated with which components of the document image. While data structures are described as including a CSS in HTML format and JSON formatted information (such as key-value pairs) for the formatting information and machine-encoded text, respectively, in the examples herein, a data structure may be of any suitable machine-manipulable format for use in performing aspects of the present disclosure.

As noted above, each template stored in the database 120 may map to formatting information. The formatting information may be included in a set of data structures (such as one or more CSSs or other data structure components), which are referred to as the M-T for the template. Since text may differ between document images based on the same template, M-T may not include specific JSON formatted text. However, M-T may correspond to a plurality of document images of the same document type.

The database 120 may include data structures organized in a file tree manner. For example, one or more CSSs (such as including an M-T) apply to document images of the same type, and unique JSON formatted machine-encoded text applies to each document image of the same type. In this manner, one or more CSSs are associated with different JSON formatted machine-encoded texts for the different documents. The CSSs may be store in a root directory, with branches from the root associated with a specific document image and storing the associated machine-encoded text. Branches may also include information from one or more CSSs that is specific to the document image (such as variations of the document image from the template). Any suitable hierarchical techniques may be used, though, to organize and store the data structures associated with one or more document images (including the templates).

The database 120 can also store one or more of (i) rules regarding segmentation of a document image, (ii) rules regarding identification of a document type for a document image, or (iii) rules regarding identification of segments in the document image. Segmentation rules are used by the apparatus 100 to segment a document image into multiple segments. In some implementations, segmentation rules includes a threshold spacing between segments. For example, a first segment and a second segment are identified as different segments based on the two segments being separated by a threshold white space (such as measured in number of image pixels). Segmentation rules may also be based on the document type identified for the document image (which may indicate positions of segments, size of segments, number of segments, and so on).

Identification rules for identifying a document type are based on observations from previous document images. The observations may be obtained through supervised learning by the training module 160. In some implementations, a plurality of documents are ingested by the apparatus 100 (or a similar apparatus to generate the identification rules for identifying a document image as a specific document type). Example documents may be financial documents, such as 1099 US tax forms (or other tax forms), customer invoices, vendor estimates or quotes, bills, credits or refunds, payment receipts, and so on. Each document image is tagged as a specific document type (such as by a user or another program or apparatus), and thus the apparatus 100 receives a group of document images for each document type. The apparatus 100 segments each document image of a document type and compares similar segments to learn the common segments for the document type. For example, an invoice document cluster has common segments of customer identification information (such as customer name, address, and so on), line items of products or services, and a total amount. Common segments may also include common graphics (such as vertical lines or other shapes, logos, and so on). Comparison of the segments allows the apparatus 100 to determine the common segments and common formatting information regarding the segments (such as position or text formatting). The comparison may include clustering of component features, as described in more detail below. As such, the apparatus 100 may generate an array of segment information for a document type (such as one or more CSSs or other formatted metadata). An array of segment information is referred to herein as [Sn], where n indicates the document type associated with the array. For example, invoices are associated with [Si], payment receipts are associated with [Sp], specific tax forms (such as 1099s) are associated with [St], estimates are associated with [Se], and so on. The arrays are stored in the database 120 to be used in identifying a specific document type for an image. The apparatus 100 is thus configured to automatically identify document images of any of the document types of the clusters associated with the [Sn]s stored in the database 120. A segment may be any granularity of a document image, and a segment may also be referred to as a component of the document image. For example, a segment or component may be a single text line, multiple text lines, a portion of a text line, a logo, or graphic, a shape (such as a line), or any other suitable portion of a document image.

Identification rules for identifying segments in a document image may also be stored in the database 120. The identification rules can be based on the document type (such as the [Sn] for the identified document type). For example, [Si] for an invoice document image indicates that a specific common segment of the document image includes a specific graphic not including text. As noted above, identified segments may be associated (or excluded from being associated) with specific formatting information. For example, a segment of the invoice document image identified as including a graphic is excluded from being associated with specific text formatting rules for the segment. In another example, a position of a segment of the document image being processed may be based on a position of a similar segment in a template document image. Identification of document type and identification of segments is described in more detail below with reference to the information extraction module 150.

The apparatus 100 can also include one or more mappings of identified document types or segments to formatting information (such as text formatting) for different segments. In this manner, an [Sn] maps to or includes formatting information for a document type and/or of one or more segments for a specific document type (which is expressed in the M-T, metadata, or other entities for the [Sn]). The formatting information specific to a document type or segment may thus be used as identification rules to identify the document type or the segment of a document type for a document image.

An example identification rule for a document type includes a distance of one component from another component of the document image. For example, an identification rule may include the distance of a graphic from another component in the document image (such as another segment, text, text line, or other suitable component). Specifically, a vendor logo for an invoice may be a defined number of millimeters (mm) away (or a range of mm away) from a customer address line. Another example identification rule for a document type includes a directionality of a specific component from another component of the document image. For example, an identification rule may include a direction of a component from a graphic. Specifically, a vendor logo for an invoice may be to the right of a customer address line. Another example identification rule for a document type includes the amount of background space (such as white space) in a document image. The background space may be measured in square mm ($mm^2$). Another example identification rule is the amount of text or non-background space in a document image. Another example identification is the placement of a component in the document image. For example, the apparatus 100 may determine whether a logo is horizontally situated in the left, center, or right portion of the document image. In addition or to the alternative, the apparatus 100 may determine whether the logo is vertically situated in the top, center, or bottom portion of the document image. While some example identification rules are provided, any suitable identification rules may be used by the apparatus 100. Some of the rules may also be used to identify specific segments (such as based on the document type).

The database 120 may also store other mappings, tables, or other organizations of document content in a master listing. For example, the database 120 stores an electronic general ledger, and the apparatus 100 updates the ledger based on received document images and specific information from specific segments of the document images (as identified based on the one or more template document images). Since updates may be based on specific segments of specific identified document image types, text content used to update the ledger is more accurately defined than attempting to identify such text content after performing only OCR and NLP (without reference to formatting information). Accuracy in the automatic generation of invoices or receipts based on received invoices is also improved in this manner.

As noted above, the apparatus 100 uses any number of features or variables of formatting information to identify a document type, segments of a document, or specific formatting information of one or more components of the document image. Document images of a same document type have common features. However, the features may not be exactly the same. For example, spacing between components may be similar but not the exact same number of mm in the exact same direction. In another example, font size or style may be similar but not exactly the same. In a further example, the amount of white space (or background space) in the document images of a document type may be similar but not exactly the same. The rules may thus be determined as ranges or groupings under supervised training to validate results of classifying document images or components. Inclusion of additional document images may also cause changes to the rules (such as changes to ranges in spacing between specific components or other features). Such rules or adjustments are stored in the database 120 for classifying a document image as a document type and/or classifying components of the document image.

The one or more processors 130 are capable of executing scripts or instructions of one or more software programs stored in the extraction apparatus 100 (such as within the memory 135). The processors 130 can be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 can be implemented as a combination of computing devices (such as a combination of a DSP and a microprocessor, a plurality of microprocessors, one or more microprocessors in conjunction with a DSP core, or any other such configuration). In some implementations, the processors 130 can be remotely located from one or more other components of the apparatus 100. As noted above, the processors 130 may be capable of executing scripts associated with one or more of the modules 140-160.

The memory 135, which can be any suitable persistent memory (such as non-volatile memory or non-transitory memory), can store any number of software programs, executable instructions, machine code, algorithms, and the like that can be executed by the processors 130 to perform one or more corresponding operations or functions. In some implementations, the memory 135 stores instructions that, when executed by the one or more processors 130, cause the apparatus 100 to perform operations associated with one or more of the modules 140-160 or other suitable techniques for information extraction as described herein. In some implementations, hardwired circuitry can be used in place of, or in combination with, software instructions to implement aspects of the disclosure. As such, implementations of the subject matter disclosed herein are not limited to any specific combination of hardware circuitry and/or software.

The segmentation module 140 is configured to segment a document image into multiple segments. The segmentation module 140 is implemented in software executed by the one or more processors 130, hardware, or a combination of both. To segment a document image, the segmentation module 140 identifies locations in the document image separated from one another. For example, an invoice document may include a graphic, customer or vendor identification information, line item information, totals and other summary information, signature information, and one or more shapes or objects separated by white space (or other color background space).

Figure 2A:
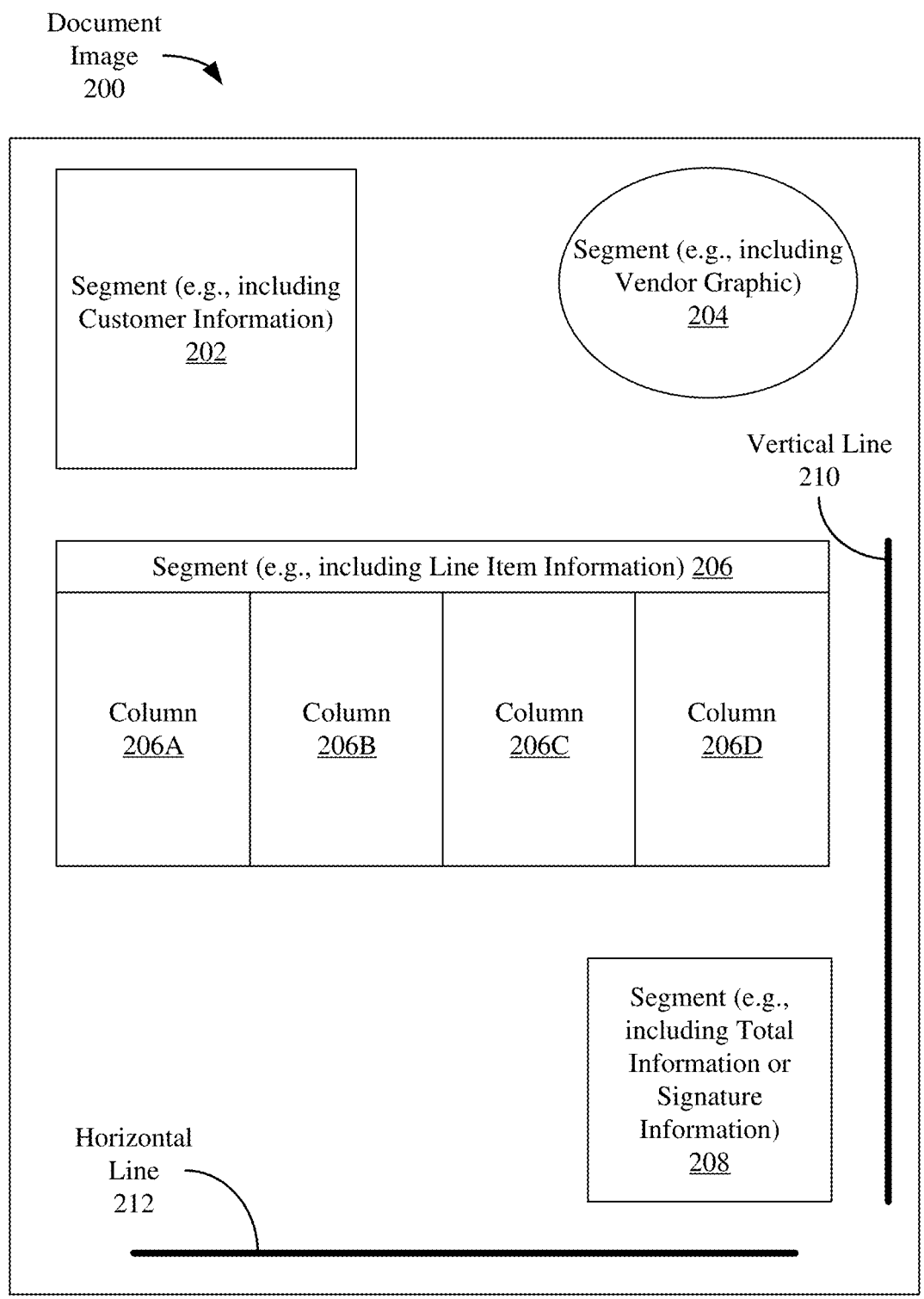
FIG. 2A shows an example document image to be processed by an extraction apparatus.

FIG. 2A shows an example document image 200 to be processed by the extraction apparatus 100. The document image 200 may be an invoice from a specific vendor. The document image 200 includes segments 202-212. For example, the document image 200 may include customer information in segment 202, a vendor graphic in segment 204, line item information in segment 206 (such as in a table format including columns 206A-206D), total information or signature information in segment 208, vertical line 210, and horizontal line 212. Invoices from the specific vendor may have some of the same format as document image 200. As such, some data structures including formatting information for the different segments may be associated with a template in the database 120 of the apparatus 100.

The segmentation module 140 segments the example document image 200 into the segments 202-212. For example, the segmentation module 140 identifies a unique neighborhood of pixels in the document image associated with each segment 202-212. Example operations in segmenting a document image are described in more detail below with reference to FIG. 4 and the example document image 200 in FIG. 2A.

Referring back to FIG. 1, the information extraction module 150 is configured to determine formatting information for one or more segments of the document image. For example, the information extraction module 150 identifies the template matched to the document image being processed. The information extraction module 150 then identifies formatting information based on the template (such as locations of text or objects, text formatting, graphics, shapes, and other formatting information). In this manner, the module 150 may identify a segmented document image as a specific document type. In some implementations, the information extraction module 150 determines formatting information without the aid of a template for the document image (such as when the document image does not match a specific template).

As noted above, example formatting information includes a location (or position) of a segment in the document image. In some implementations, a segment location is indicated in a two-dimensional matrix mapping to different locations in a document image. For example, each entry in a pixelated matrix of size 100×100 maps to a location in a document image (such as based on compressing the document image of a larger size to a 100×100 matrix). Referring to FIG. 2A, one or more pixels in the top-left corner of the document image 200 may map to pixel (0,0) in the 100×100 matrix, one or more pixels in the top-right corner of the document image 200 may map to pixel (99,0) in the 100×100 matrix, one or more pixels in the bottom-left corner of the document image 200 may map to pixel (0,99) in the 100×100 matrix, and one or more pixels in the bottom-right corner of the document image 200 may map to pixel (99,99) in the 100×100 matrix. The apparatus 100 determines a location based on a center of the segment, top left pixel of the segment, or any other suitable location in the segment. In using a generic matrix instead of an actual size of the document image, the apparatus 100 may generate different resolution document images (such as generating a copy document image with less resolution than the original document image). In this manner, any suitable resolution document image maps to the generic size matrix mapping locations of segments. In some implementations, a size of a segment may also be indicated in the matrix by associating a neighborhood of entries in the matrix with the segment. Therefore, the matrix may be used by the apparatus 100 to indicate the location and the size of each segment of a document image. Entries of the matrix are stored in the one or more data structures to indicate the location (and, optionally, the size) of each segment in the document image. In some implementations, positioning is additionally or alternatively with reference to another component of the document image. For example, positioning of a logo is determined to be to the left, right, below, or above a specific component of the document image. Example formatting information may also include spacing between segments. The spacing can include a distance and a direction. The direction may be measured with reference to the orientation of the document image, and the distance may be measured in mm or another suitable unit of measure (such as number of pixels).

The apparatus 100 uses the positions of segments and the spacing of segments to identify a document type for the document image. For example, [Sn] associated with a specific document type includes rules regarding positions of specific components and spacings between components. In a specific example, common features of an invoice regarding spacing can include: (i) distance of a logo from a specific component (such as from a specific graphic); (ii) distance of a logo from a specific text line (such as from a customer address line); or (iii) distance of a logo from a specific table (such as a specific column of a table). Common features of an invoice can also be regarding placement of the logo or other component (such as center top of the document image, right top, bottom right, and so on). For example, all invoices may include a table at the center of the document image.

Many features can be in combination to indicate the document type. In this manner, the document image is to satisfy multiple rules to be classified as a specific document type. For example, a first set of invoices (such as from a first group of vendors) may be associated with a logo in the top center (rule 1). In addition, a first portion of vendors is associated with including a text component to the right of the logo, and a second portion of vendors is associated with including a text component to the left of the logo (rule 2). Furthermore, whether the document image is an invoice and for a specific vendor is also based on the amount of white space in the document image (rule 3). As such, the apparatus 100 (such as the module 150) may classify the document image as an invoice from a specific vendor based on satisfying rule 1, rule 2, and rule 3 for the document type of an invoice from that specific vendor.

Rules may also be based on other types of formatting information. Example formatting information for a segment also includes other information (which may be based on the segment type). For example, a segment including a graphic (such as a company logo) may include the graphic (such as a compression of the graphic) in the formatting information. For a segment including text, formatting information includes information regarding the formatting of the text. In some implementations, multiple lines of text may be identified (such as based on OCR which indicates the locations of characters in the segment). The apparatus 100 divides the text into the lines for processing. In some implementations of dividing the text into lines, the apparatus 100 divides a plurality of pixels into groups of pixels, with each group including pixels of the document image for text on one line. The group of pixels associated with a line of text may be referred to as a line group. The apparatus 100 then compares the line groups to one another to determine the text formatting. In comparing line groups, the apparatus 100 compares contrasts between one or more pixels. For example, text is one color (such as black) on a different color background (such as white). When text is present, contrasts between pixels varies from zero (between similar pixels, such as white pixels or black pixels) to a non-zero value (such as between a white pixel and a black pixel). In this manner, the contrasts of pixels when moving across a plurality of pixels in the segment intermittently changes between a zero contrast and non-zero contrast.

One text formatting is text alignment. If text is left aligned, the contrast being non-zero for different line groups consistently occurs at the same column in the segment (with non-zero contrasts occurring at previous columns of the segment). Right alignment, top alignment, or bottom alignment may also be determined in a similar manner.

Another text formatting is indentation. Text from one line group is indented if the contrast is first non-zero at a pixel column of the segment to the right of pixel columns for which text is aligned for other line groups. The apparatus 100 may use indentation to determine paragraphs, lists, or other text structures in the text of a segment. Another text formatting is line spacing. For example, the apparatus 100 determines the number of rows of background color (with zero contrasts) between lines of text before the next row includes non-zero contrasts indicating pixels for text. The number of rows are converted to a line spacing for the text in the segment. While some examples of text formatting are provided, any suitable text formatting may be determined by comparing contrasts (such as to determine whether zero or non-zero contrast to indicate changes between foreground/text pixels or background pixels), including font size, font style, italicization, boldening, and so on.

Another example formatting information includes shapes. Tables may include one or more lines or boxes to indicate different entries in the table. The apparatus 100 compares contrasts between neighboring pixels in a segment to identify one or more shapes (including boxes or lines). The apparatus 100 determines the presence of a table (such as in segment 206 in FIG. 2A) from an organization of boxes or lines. Such identified shapes are indicated in the formatting information so that they may be recreated in generating a copy of the original document image from the set of data structures. Each of the different examples (or other suitable forms) of formatting information may be referred to as component features.

In addition to identifying component features, the information extraction module 150 may also generate machine-encoded text for segments including text to be identified during information extraction. For example, the information extraction module 150 applies OCR to the document image (or one or more segments of the document image) to generate a machine-encoded text. The information extraction module 150 packages the formatting information (such as in one or more CSSs) and the machine-encoded text (such as in key-value pairs of JSON formatting) into one or more data structures, and the one or more data structures are provided to the database 120 to be organized and stored so that the set of data structures are associated with the specific document image. If the data structures are sufficiently comprehensive and accurate of formatting information of the document image, a copy of the document image may be reproduced from the set of data structures associated with the original document image.

As noted above, the apparatus 100 uses any number of features or variables of formatting information to identify a document type or segments/components of a document image. Document images of a same document type have common features, and the same type components may have common features. However, the features may not be exactly the same. For example, spacing between components may be similar but not the exact same number of mm in the exact same direction for document images of the same document type. In another example, font size or style may be similar but not exactly the same for the same document components across a document image or different document images. In a further example, the amount of white space (or background space) in the document images of a document type may be similar but not exactly the same number of square mm. As such, true/false rule based systems in identifying a document type or specific components of a document image may not be sufficient.

In some implementations of identifying a document type or specific components based on component features, the apparatus 100 attempts a best fit of the totality of component features to the totality of common component features of different document types. The module 150 and/or module 160 may thus process the determined component features for a document image to attempt to determine a document type of component types. For example, a position of a component in the document image, a style of the component in the document image (such as a text formatting feature), and other component features are determined for each component. In this manner, each component is mapped in x-dimensions (with x equaling the number of component features determined for each component).

Figure 2B:
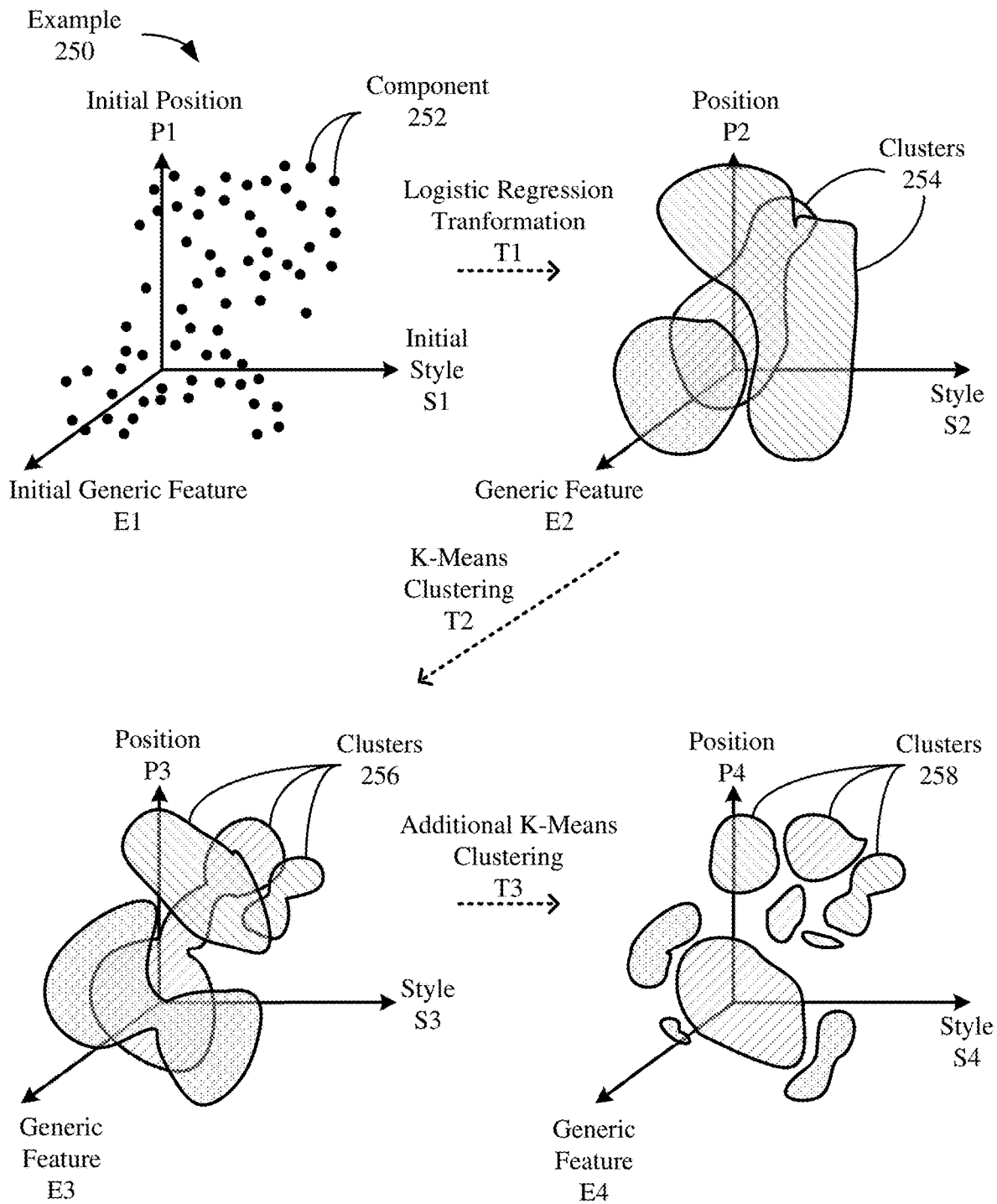
FIG. 2B shows a simplified example of organizing component features for classifying a document image.

FIG. 2B shows a simplified example 250 of organizing component features for classifying a document image. In the example 250, three component features are determined for each component 252 of one or more document images (such as from a corpus of previous document images): position of the component in the document image (P); style of the component (S; such as a text formatting style); and another generic feature or component (E; which may be any suitable feature). Three component features are illustrated so that the transformations and illustrations may be visualized in a three dimensional space in the example 250. However, any number of features may be used (with the number of dimensions being greater than 3). As shown, each component 252 includes initial features P1, S1, and E1 as measured by the apparatus 100.

Each document type may be associated with clusters of components with similar component features (such as one component type having similar positions, styles, and other features). The apparatus 100 (such as module 160) clusters the components using any suitable number of transformations. Example transformations include logistic regression, k-means clustering, and convolutional neural networking (CNN) to generate clusters associated with the document image. In the example 250 in FIG. 2B, the apparatus 100 performs a logistic regression transformation (T1) on component features 252 to generate clusters 254 of transformed data. During logisitic regression, the apparatus 100 excludes components from one or more clusters based on a probability that the component is in such cluster. In this manner, a first set of clusters 254 take form, but may be large and over-inclusive. Thus, the clusters 254 may be too unwieldly to properly classify document images or components. For example, components of multiple component types may be included in the same cluster 254, or there may exist overlap between clusters 254.

The apparatus 100 thus performs a k-means clustering (T2) on the transformed data of clusters 254 to generate clusters 256 of transformed data. As shown, the clusters 256 are more focused than the clusters 254. Also, the number of clusters 256 may be greater than the number of clusters 254. However, the clusters 256 may still be too unwieldly to properly classify document images or components. The apparatus 100 thus performs an additional transformation (T3) on the transformed data of clusters 256 to generate clusters 258 of transformed data. In some implementations, T3 is additional k-means clustering on the transformed data of clusters 256. In some other implementations, T3 is use of a CNN to generate more focused clusters 258. While T1-T3 are illustrated to show three transformations, any number of transformations may be performed. For example, T3 may be k-means clustering, and a T4 may be use of a CNN. In another example, multiple transformations may correspond to using the CNN, with each transformation corresponding to an epoch of the CNN.

Clusters 258 are the final clusters to differentiate different document types including components 252. Each cluster may indicate a specific component type. The mapping of feature components of a present document image may be compared to mappings of clusters (or centers of clusters) of different document types to classify the document image as a specific document type. For example, the apparatus 100 determines an absolute sum of distances between a center of a cluster associated with a specific document type and a mapping of a component's features of the document image across all components for the document image and all document types. The apparatus 100 classifies the document image as a specific document type associated with the smallest sum of distances calculated (as compared to the sums determined for each document type with reference to the document image). In some implementations, the cluster information may be included in the arrays of segment information for the different document types (described above). In this manner, the apparatus 100 may compare groups of component features from a document image to the arrays of segment information in comparing one or more segment features to one or more clusters.

In some implementations, clusters can indicate important/common features of components. For example, a truth matrix of 0s (for false) and 1s (for true) with reference to component features for different component types is generated. If the component types have a specific component feature in common (such as a common font size, line spacing, and so on), such component feature is marked as a 1 for the component type. Entries with a 1 in the matrix thus indicate common features for determining a component type. Such common features can be used as the rules by the apparatus 100 for identifying a segment/component as a specific type.

While the components 252 are illustrated as having values for each feature, some features may not be measurable for some segment types. For example, a graphic or image may not be associated with a specific font size or style (or other text formatting). In some implementations, such features may be set to a default value (such as zero) to indicate that the feature is not relevant to or measurable the specific component.

In addition to clustering for classification/identification, there may exist gaps or inconsistencies in information in a set of data structures that causes errors in attempting to generate a copy document image that mimics the original document image. For example, the data structures may indicate an incorrect location of a segment, an incorrect size or boundary of a segment, incorrect text formatting in a segment, or other incorrect information. The training module 160 is configured to adjust determining formatting information. In some implementations, the training module 160 generates a copy document image from a set of data structures associated with the original document image. The training module 160 then compares the document images to determine any errors. Determining formatting information (such as rules on contrasts between pixels to indicate a location, size, text size, alignment, justification, and so on) by the information extraction module 150 are adjusted by the training module 160 based on the identified errors. The information extraction module 150 then generates a new set of data structures using the adjusted determinations of formatting information. Such generation of a copy document image, comparison of document images, adjustment of the determination of formatting information, and the generation of a new set of data structures may be iteratively performed until the copy document image satisfactorily resembles the original document image. For example, a copy document image is acceptable if the area in the copy document image differing from the original document image is less than a threshold amount of the document image. The above operations may be performed on a segment-by-segment basis in the document image. Alternatively, the above operations may be performed on an image-by-image basis. Adjusting the determination of formatting information is described in more detail below with reference to FIGS. 5 and 6.

Referring back to FIG. 1, the particular architecture of the apparatus 100 shown in FIG. 1 is but one example of a variety of different architectures within which aspects of the present disclosure can be implemented. For example, in other implementations, the apparatus 100 may include additional components. In some other implementations, the apparatus 100 can be implemented as software as a service (SaaS), or as managed software as a service (MSaaS). For example, when implemented as SaaS or MSaaS, the functions of the modules 140-160 can be centrally hosted and can be accessed by users using a thin client, such as a web browser. Therefore, while the examples are described as being performed by the apparatus 100 (such as by the one or more processors 130), any suitable apparatus, system, service, and so on may be configured to perform the operations described herein. As such, the present disclosure is not limited to operations being performed by the specific configuration of apparatus 100 illustrated in FIG. 1.

Figure 3:
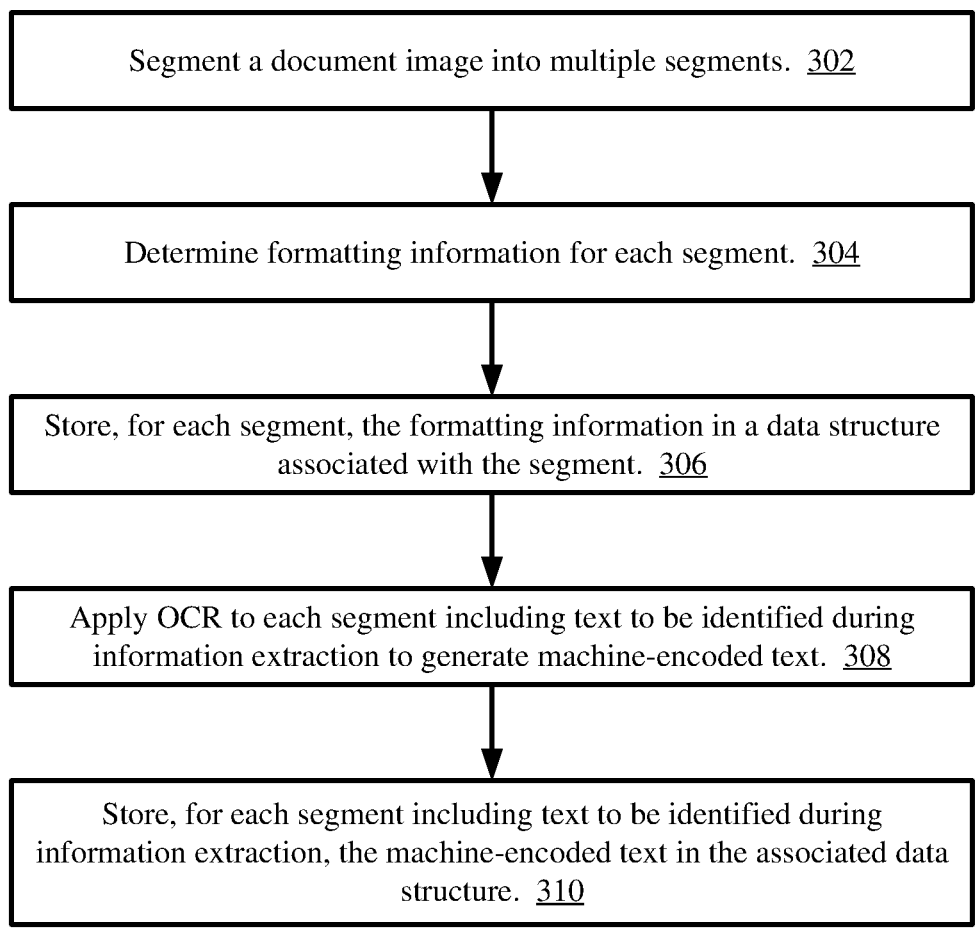
FIG. 3 shows an illustrative flow chart depicting an example operation for extracting information from a document image into one or more computer manipulable data structures.

FIG. 3 shows an illustrative flow chart depicting an example operation 300 for extracting information from a document image into one or more computer manipulable data structures (such as a set of data structures for each document image being processed). The example operation 300 can be performed by one or more processors 130 (and/or modules 140-160) of the apparatus 100 of FIG. 1. It is to be understood, though, that the example operation 300 can be performed by any suitable apparatuses, systems, computers, or servers.

At 302, the apparatus 100 segments a document image into multiple segments. Many document images are black and white images (such as a binary image to indicate foreground or background, including black text on a white background). However, some document images may include shadings or colors. In some implementations, the apparatus 100 is configured to generate a binary or a grayscale copy document image. Before segmenting a received document image with colors, the apparatus 100 may convert a color document image to a grayscale document image.

If the apparatus 100 is to reproduce colors in generating a copy document image, in converting the original color document image to grayscale, color information may be extracted and stored in one or more data structures. An array of RGB values (such as hexadecimal values) indicating the colors associated with the document image (with a location in the array associated with a location in the document image) is generated by the apparatus 100. In some examples, the array of RGB values may be used to indicate a graphic in one or more segments of the document image. For example, referring back to FIG. 2A, the array may indicate a vendor logo in segment 204.

If the apparatus 100 is to process grayscale images (such as including 256 different shades of gray), a non-zero contrast between pixels may refer to the contrast being greater than a threshold difference in the shades of gray. A zero contrast between pixels may refer to the contrast being less than the threshold difference. In some implementations, the apparatus 100 is to process binary images (for which color information may already be determined and stored). The apparatus 100 may convert grayscale images to binary images (or otherwise reduce the shading information to fewer shades of gray, such as from 256 to 8 or 16). For binary images, a non-zero contrast is a difference in values between pixels (such as between a 0 and a 1). A zero contrast is no difference in values between pixels (such as between a 0 and a 0 or a 1 and a 1). The examples are described with reference to processing binary images, but the operations may be performed for any suitable images, including grayscale images or color images.

In segmenting a document image, the apparatus 100 identifies groups of neighboring pixels with non-zero contrasts (indicating changes between foreground (such as text or a graphic) and background) separated from other neighboring pixels with non-zero contrasts by a pixel distance. As used herein, a pixel distance is a threshold number of pixels of a zero contrast separating two groups of pixels with non-zero contrasts. In some implementations, the pixel distance is a threshold number of pixels with a background value (such as 0 or a white background) separating a first group of pixels with non-zero contrasts (indicating the presence of 1s or black pixels) in proximity to one another and a second group of pixels with non-zero contrasts in proximity to one another.

Referring back to FIG. 2A, segment 202 is separated from segment 204 and segment 206 by at least a pixel distance, segment 206 is separated from segment 210 and segment 208 by at least the pixel distance, and segment 208 is separated from segment 210 and segment 212 by at least the pixel distance. Segmenting a document image into segments includes associating groups of pixels from the document image with different segments. For example, the box around 202 in FIG. 1 indicates the boundary of pixels associated with the segment 202. Segmenting a document image is described in more detail with reference to FIG. 4 and the document image 200 in FIG. 2A below.

Referring back to FIG. 3, at 304, the apparatus 100 determines formatting information for each segment 304. In determining the formatting information, the apparatus 100 processes the group of pixels in the document image associated with the segment. As noted above, determining formatting information includes determining a location/position, a spacing between segments, and/or comparing contrasts between pixels to determine other formatting information (such as text formatting, graphics, object/shapes, and so on). For example, the apparatus 100, in comparing contrasts between pixels, identifies the lines at 210 and 212, the lines in the table at 206 (such as separating columns 206A-206D), the graphic at 204, and text formatting at 202, 206, and 208.

In some implementations, determining formatting information includes determining a template that is similar to the document image or otherwise identifying the document type. As noted above, a template includes formatting information that is common across document images of the same type. In some implementations, required or common segments across document images of a same type have similar locations in the document images or other similar features. For example, the segments of the document image 200 (FIG. 2A) may be the important or common components of invoices from a particular vendor. The locations of the segments 202-212 (as identified by the apparatus 200) are compared to locations of segments for one or more templates in the database 120. As noted above, the locations may be indicated in a 100×100 matrix mapping to different areas of a document image. In this manner, the apparatus 100 compares the 100×100 matrix indicating the identified locations of the segments of the current document image to one or more 100×100 matrices indicating the locations of the required or commons segments for one or more templates. The apparatus 100 matches the current document image to a template by matching entries in the corresponding matrices of the document image and the template. While matching segment locations is described in matching a template, the number of segments may also be used in matching a template.

While classifying a segment or matching a template is described in the above examples with reference to one component feature (such as position/location or number of components), a plurality of component features of the document image may be compared to those associated with each document type (such as described above with reference to FIG. 2B regarding clustering and identification). In some implementations, the apparatus 100 determines a plurality of component features for one or more segments of a document image. Each document type is associated with clusters of component features that differentiate the document type from other document types. The apparatus 100 attempts to match the determined component features to the clusters of component features associated with a component type. If the component features of the document image match the clusters of component features for the document type, the apparatus 100 determines that the document image is of the matched document type. Matching clusters and document types may be based on a distance operation of the features for the document image from the associated clusters. For example, a multi-dimensional distance (with the number of dimensions based on the number of features for a cluster) is determined for each component feature for the document image, and an absolute value of the distances are summed to determine a total distance. The apparatus 100 may determine a total distance for multiple document types, and the smallest total distance is associated with the document type that is matched to the document image. Thus, based on matching the component features to the clusters of component features associated with a document type, the apparatus 100 determines a document type for the document image. As noted herein, matching a document type may also be based on an amount of white space (or background space) in the document image (compared to the document type). Matching may also be based on location(s) of the white space (or background space) in the document image (compared to the document type). As noted above with reference to FIG. 2B, generating clusters may be performed using one or more transformations on the groups of component features determined for previous document images. Clustering may thus be performed or updated periodically as new document images are analyzed by again applying the one or more transformations to stored component features for previous document images.

In addition to determining a document type, matching clusters may also be used to determine a component type for a segment. For example, a specific component type may be associated with a specific cluster of component features. If a segment's features matches the cluster of component features for a component type, the apparatus 100 may identify the segment as the matched component type.

In matching clusters, the truth matrix for the component types may indicate which component features are to be used in comparing a segment's features to the clustering of features for the component type. In this manner, comparing component features may be tailored to the specific component type being compared to one or more segments (comparing only important features for a cluster). In addition to a mapping of positions of segments, a template for a document type may include the other features for the clusters of the document type and/or the truth matrix entries to indicate the important features of a cluster. As such, the matched template may indicate the types of segments of the document image. Matched clusterings or truth matrix entries of important features may also indicate a segment/component type. For example, with the document image 200 matched to an invoicing template for the vendor (based on clustering), the template may indicate that the segment 204 is a graphic, the segment 202 is customer identification information, segment 206 is a table including line item information, and segment 208 is signatory information or summary financial information (such as a total, taxes, fees, and so on) for the invoice. In some implementations, a signature is treated as a graphic (as described above). Some formatting information may be based on the type of segment or the matched template (such as text formatting for segment 202 or segment 206, lines or other objects for columns 206A-206D or segments 210 and 212, and so on). The apparatus 100 determines some formatting information from the template (such as common features for a segment type). In this manner, the apparatus may determine one or more features of each segment and compare the one or more features of the segment to one or more clusters of features associated with different document types (with the formatting information for the segment being based on the comparison). The apparatus 100 may additionally or alternatively compare contrasts to determine text formatting or objects as additional formatting information.

In some implementations, the type of text in a segment (such as a text label) is based on the matched template. For example, if segment 202 includes a customer address in the customer identification information, the first text line may include a name, the second text line may include a street, the third text line may include a city, and so on. In another example, line item information in the table in segment 206 may include a number of items in the first column 206A, a description of the item in the second column 206B, a net price without tax for an item in third column 206C, and a total price with tax for an item in fourth column 206D. The template may indicate the labels of common segments.

In determining formatting information, the apparatus 100 determines the type of text for portions of the text (such as per line, per column, and so on). In this manner, during OCR, the apparatus 100 may ensure that the text content identified for a portion of text conforms to the specific type of text identified. For example, the apparatus 100 ensures only numbers are identified in columns 206A, 206C, and 206D in the table. Determining the type of text also allows the apparatus to tag portions of the machine-encoded text as to be used in specific fields for a financial ledger (such as specific address fields or amounts to be paid or so on) or to tag portions of the machine-encoded text as to be manipulated by the apparatus 100.

At 306, the apparatus 100 stores, for each segment, the formatting information in one or more data structures associated with the segment. For example, in processing the document image 100, the apparatus 100 stores a first data structure including the formatting information (such as in a first one or more CSSs) for the segment 202, stores a second data structure including the formatting information (such as in a second one or more CSSs) for the segment 204, stores a third data structure including the formatting information (such as in a third one or more CSSs) for the segment 206, and so on. If the segment includes color information to be saved in the data structure (such as for a graphic in segment 204), the corresponding data structure may also include an RGB or hexadecimal array indicating the colors and locations in the segments.

At 308, the apparatus 100 applies OCR to each segment including text to be identified during information extraction to generate machine-encoded text. If the document image is matched to a template in the database 120, some of the segments in the template (and thus the document image) may not be associated with text to be identified. For example, segment 204 in document image 200 may include a graphic (such as a logo) and thus not include text that is to be identified. In this manner, the apparatus 100 may apply OCR to only portions of the document image instead of the entire image (such as to segments 202, 206, and 208 presumed to include text in the document image 200 based on the matched template). If applying OCR to specific segments of a document image on a segment-by-segment basis, machine-encoded text is generated for each relevant segment in the document image. For example, a first machine-encoded text is generated for segment 202, a second machine-encoded text is generated for segment 206, and a third machine-encoded text is generated for segment 208 of the document image 200

At 310, the apparatus 100 stores, for each segment including text to be identified during information extraction, the machine-encoded text in the associated data structure. For example, the first machine-encoded text is stored in the data structure associated with segment 202, the second machine-encoded text is stored in the data structure associated with segment 206, and the third machine-encoded text is stored in the data structure associated with segment 208. The machine-encoded text (which may be in a JSON format) may be accessible by the apparatus 100 or other devices to perform NLP or other text analytics regarding the text content.

Referring back to 302, segmenting a document image may be based on spacings of zero contrasts between groups of pixel with non-zero contrasts and in close proximity to one another. FIG. 4 shows an illustrative flow chart depicting an example operation 400 for segmenting a document image. Operation 400 is an example implementation of block 302 in FIG. 3. The blocks in operation 400 are described with reference to document image 200 in FIG. 2A for clarity purposes.

At 402, the apparatus 100 determines a first group of pixels with non-zero contrasts and based on proximity between the first group of pixels. For example, if the document image 200 is a binary image, a first group of pixels includes pixels with value 1 separated by fewer than a threshold number of pixels with value 0. Neighboring pixels of value 0 and 1 are associated with a non-zero contrast, and neighboring pixels of all 0s are associated with a zero contrast. Segment 202 in the document image 200 includes a first group of pixels with non-zero contrasts. The non-zero contrasts may be between text pixels and background pixels. In one example for the first group of pixels, pixels with non-zero contrasts are within a threshold pixel distance of one another (404). In this manner, each pixel associated with a non-zero contrast (such as a non-background pixel or pixel including a value 1 in a binary image) is separated from a neighboring pixel with a non-zero contrast by less than a threshold number of pixels (such as background pixels or pixels including a value 0). Once a pixel is separated from a next pixel by more than a threshold number of zero contrast pixels, the next pixel may be considered to be part of a different segment. For example, the box around segment 202 indicates the boundary of pixels in the segment associated with a non-zero contrast. The next non-zero contrast pixel I in segment 206, which is separated by a threshold number of rows with zero contrast (such as background or white pixels). The threshold may be defined in the segmentation module 140 and may be variable or static. A variable threshold may be user adjustable, adjusted based on document type, or adjusted based on errors in a copy document image during training.

At 406, the apparatus 100 determines a second group of pixels with non-zero contrasts and based on proximity between the second group of pixels. Determining the second group of pixels may be similar to determining the first group of pixels in block 402. For example, pixels with non-zero contrasts are within a threshold pixel distance of one another (408). Block 408 may be similar to block 404. As noted above, too, the first group and the second group may be separated by a pixel distance (410). For example, segment 202 and segment 204 are separated by at least a threshold number of columns of zero contrast or background pixels, and segment 202 and segment 206 are separated by at least a threshold number of rows of zero contrast or background pixels.

At 412, the apparatus 100 associates a first area of the document image including the first group of pixels (and not including the second group of pixels) with a first segment. At 414, the apparatus 100 associates a second area of the document image including the second group of pixels (and not including the first group of pixels) with a second segment. While the example operation 400 shows segmenting a document image to include two segments, blocks of the example operation may be performed multiple times to segment the document image into any number of segments. In some implementations of segmentation, pixels of the document image not included in a segment are considered background pixels (which may include a zero contrast).

In some other implementations of segmentation, the apparatus 100 determines the distribution of non-background pixels (such as pixels with value 1 or non-white pixels) in the document image. For example, the apparatus 100 determines clusterings of such pixels that indicates the locations of segments in the document image (with clusters being separated by a pixel distance of background pixels).

As noted above, the set of data structures for an original document image may be used to generate a copy document image. In this manner, a document image may be generated to resemble the original but still allow some information to be edited before generation (such as changes in prices, customer information, line items, and so on). In another example, the apparatus may be allowed to store just the sets of data structures without storing the original document images if the data structures are sufficient for generating a copy of the document image.

However, scanning issues (such as noise or interference) may cause the formatting information to include errors in the data structures. For example, line 210 may be shorter in the document image 200 than in the template associated with the document image. In another example, some text may be misaligned based on creasing in a physical document during scanning. In a further example, optical distortions (such as from a camera) can cause locations of segments, sizes of segments, shapes, object, and other formatting information to be incorrectly indicated in the data structures. In another example, a component feature not previously determined may be important in reconstructing the document image.

In some implementations, the apparatus 100 can train the information extraction module 150 to adjust determining formatting information to improve the accuracy or comprehensiveness of the data structures to represent the layout and style of the document image. In some implementations, adjustments are performed iteratively until a set of data structures satisfactorily represents the information (including the formatting information) in the document image. For example, the apparatus 100 may iteratively adjust the determination of formatting information for the document image, determine new formatting information for the document image based on the adjustment, generate a new copy document image based on the new formatting information, and compare the new copy document image to the document image until the copy document image is satisfactory. Adjusting formatting information may include adjusting locations of segments, adjusting the comparisons of the clusters to identify a document type or segment type, or other suitable adjustments.

Figure 5:
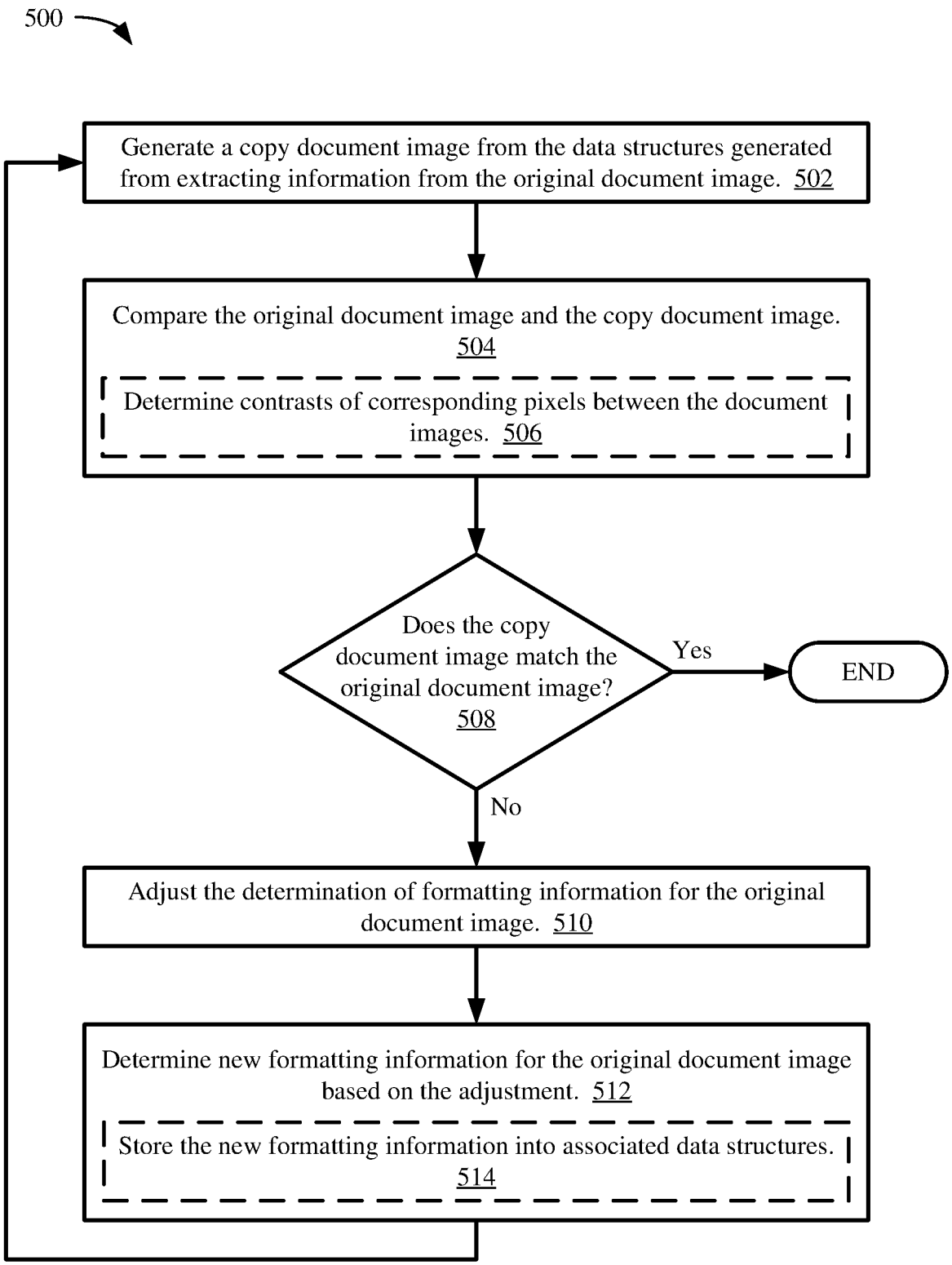
FIG. 5 shows an illustrative flow chart depicting an example operation for improving determining formatting information for a document image.

FIG. 5 shows an illustrative flow chart depicting an example operation 500 for improving determining formatting information for a document image. The example operation 500 can be performed by the one or more processors 130. It is to be understood, though, that the example operation 500 can be performed by any suitable apparatuses, systems, computers, or servers. At 502, the apparatus 100 generates a copy document image from the data structures generated from extracting information from the original document image. For example, the formatting information in one or more CSSs indicates the location and size of each segment, text formatting, graphics, and other suitable layout information used to generate the copy document image. The text content of one or more segments in the copy document image is generated from the machine-encoded text (in JSON format) in one or more data structures.

At 504, the apparatus 100 compares the original document image and the copy document image. For example, the apparatus 100 determines if the segments between the original and the copy match (such as the location, size, text formatting, and other features matching between images). In some implementations of comparing the document images, the apparatus determines contrasts of corresponding pixels between document images (506). For example, the value of pixel (0,0) in the original document image and the value of pixel (0,0) in the copy document image are compared to determine if the contrast of the corresponding pixels is a non-zero contrast (different values) or a zero contrast (same values). If the images are grayscale or color images, shades of gray or hues within a threshold range from each other for the two pixels are associated with zero contrast (while outside the threshold range are associated with a non-zero contrast. In the examples, comparing binary images are described for clarity purposes (with non-zero contrast associated with one image's pixel having a value 0 and the other image's pixel having a value 1 and zero contrast associated with the pixels having a same value 0 or 1).

Figure 6:
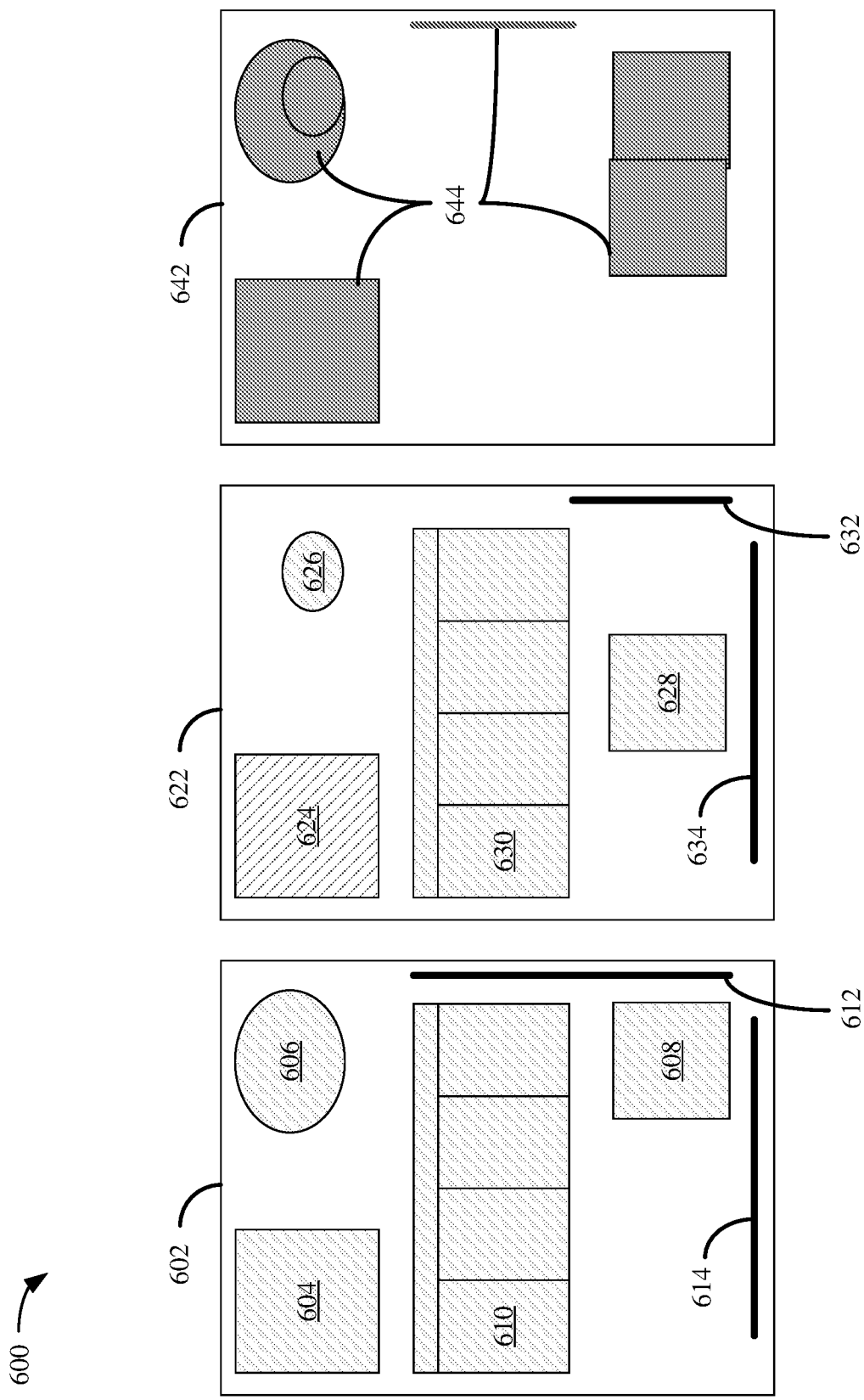
FIG. 6 shows an example original document image and copy document image compared in improving determining formatting information.

FIG. 6 shows an example depiction 600 of an original document image 602 and a copy document image 622 compared in improving determining formatting information. The original document image 602 is an example implementation of the document image 200 in FIG. 2A. The copy document image 622 is the document image generated from the set of data structures generated in processing the document image 602. Object 642 is a mapping of the areas of differences 644 between the document images 602 and 622. In some implementations, the original document image is also based on a template identified for the original document image (such as predefined graphics and objects). For example, the lines 612 and 614 may be the same for all such invoices, but scanning a physical document may have caused the line 612 to be cut short due to noise or interference (as illustrated by line 632 in the copy document image 622).

As shown in FIG. 6, the original document image 602 includes segments 604-614, and the copy document image 622 includes segments 624-634. The different cross-hatching between segments 604 and 624 indicates a difference in text formatting (such as different text alignment, different font size, different line spacing, different font style, and so on). Segment 606 is a different size than segment 626, which may indicate a difference is size of a graphic (such as a company logo). Segment 608 is at a different location in the image 602 than the segment 628 is in the image 622. The line in segment 612 is longer than the line in segment 632. In comparing the two images, segments 610 and 630 are the same (such as the same table in shown in segment 206 in FIG. 2A) and the lines in segments 614 and 634 are the same (such as the same length, location, thickness, and so on).

In comparing the document images 602 and 622, the apparatus 100 determines a contrast between pixels at the same location between the images 602 and 622. For example, pixel (0,0) in the document image 602 and in the document image 622 are compared to determine a contrast, pixel (1,0) in the document image 602 and in the document image 622 are compared to determine a contrast, pixel (0,1) in the document image 602 and in the document image 622 are compared to determine a contrast, and so on until all pixels in the document images 602 and 622 of size M×N are compared to determine a contrast. In this manner, the apparatus 100 determines contrasts of corresponding pixels on a pixel-by-pixel basis.

A pixel (m,n) in the original document image 602 is considered different than a pixel (m,n) in the copy document image 622 (for m between 0 and M and n between 0 and N) if the contrast is non-zero. A pixel (m,n) in the original document image 602 is considered the same as a pixel (m,n) in the copy document image 622 if the contrast is zero. Object 642 illustrates for which pixels of the images 602 and 622 the apparatus 100 determines non-zero contrasts (indicated by the shading at areas 644). While each area 644 may include speckling where some pixels match in the areas, the areas are shown as consistently shaded for ease in explanation aspects of the present disclosure.

Referring back to FIG. 5, the apparatus 100 determines if the copy document image matches the original document image at decision block 508. In determining the contrast of corresponding pixels between images, the copy document image sufficiently matching the original document image is based on the number of pixels with a non-zero contrast between images being less than a threshold of the total number of corresponding pixels. For example, the apparatus 100 determines if the number of pixels with non-zero contrasts (illustrated by the shaded areas 644 in object 642 (FIG. 6)) is less than a threshold number or portion of the total number of pixel pairs M*N in the document images 602 and 622. An example threshold may be 3 percent of the total number of pixel pairs (0.03*M*N). In such an example, the areas 644 are greater than 3 percent of the entire object 642. As such, the copy document image 622 would be determined to be different (not match) than the original document image 602.

At decision block 508, if the copy document image matches the original document image, the generated set of data structures are kept for the original document image. In this manner, no changes are made in determining formatting information. If the apparatus 100 determines that the copy document image does not match the original document image, the apparatus 100 adjusts the determination of formatting information for the original document image (510).

In some implementations, adjusting the determination of formatting information is on a segment-by-segment basis. For example, segment 624 in image 622 is different than segment 604 in image 602 based on a difference in text formatting. With only a difference in text formatting existing, the locations and sizes of the segments 624 and 604 may be the same, but the style of the text differs to cause non-zero contrasts between pixels. The apparatus 100 thus changes one or more text formatting determinations for the segment 604 to attempt to cause a newly generated segment to have closer text formatting than the segment 624. Example text formattings that may be adjusted include one or more of font style, font size, text alignment, text indentation, justification, italicization, or bolding.

In another example, segment 606 in image 602 is different in size than segment 626 in image 622. For segments associated with graphics that are different in size, the apparatus 100 adjusts the graphic determined for the segment 606. For example, the template may indicate the correct graphic which was not accurately determined because of noise in the scanned image. In such an example, the graphic from the template may be used in the data structures for the document image (instead of the graphic previously determined in generating the data structures). In another example, compression or encoding of the graphic in the data structure may cause an incorrect generation of the graphic in the copy document image 622. As such, the compression or encoding is adjusted.

In a further example, the location of segment 608 is different than the location of segment 628. In some implementations, the apparatus 100 adjusts the location of the segment 628 (such as by adjusting one or more entries in the matrix mapping to locations of segments in the document image). After adjusting the location of the segment 628, the apparatus 100 compares the pixels of segment 608 to the pixels of moved segment 628. If the contrasts are zero, only the location of the segment 628 is incorrect (which is adjusted).

In another example, the line in segment 612 is longer than the line in segment 632. Objects and shapes that differ may be based on issues in compression or encoding or issues in scanning (such as noise or interference). In some implementations, the apparatus 100 uses information about the shape or object from the matched template to ensure the objects match. In some other implementations, the apparatus 100 adjusts the compression or encoding (similar to as described above with reference to segment 626 including a graphic).

In some examples, the images not matching are based on an incorrectly matched template. The apparatus 100 may remove a template from being matched to the original document image in adjusting the determination of formatting information. In some other examples, the images not matching are based on the pixel distances to determine segments, line groups, and so on being incorrect, or otherwise the clusterings being incorrectly defined for the document image. The apparatus 100 may adjust the pixel distances to be used or may adjust the comparison with clusters (such as which features to compare, the number of features, the qualifications to match a document image to a document type or a segment to a segment type, and so on). Other suitable adjustments may also be performed, including changing a segment from one type to another (such as from a segment including a graphic to a segment including text), adjusting the grayscale operation or binary conversion operation performed by the apparatus 100 (such as reducing or increasing the depths of grays or adjusting the threshold hue or gray value for generating a binary image), adjusting the color information stored for one or more segment of the original document image, adjusting the clusterings for the document image (such as removing, adding or adjusting component features for different document types or performing another transformation on the existing clusters of features), including additional component features to be determined and stored, and so on.

After the adjustments at block 510, the apparatus 100 determines new formatting information for the original document image based on the adjustment (512). For example, the new formatting information is stored in the associated data structures of the new set of data structures for the original document image (514). After updating the set of data structures for the original document image, the process may revert to block 502. In this manner, adjusting the determination of formatting information may be iteratively performed until the original document image and the copy document image match (such as the number of pixels with non-zero contrasts between the images being less than a threshold).

Recreating the new document image may be brute force based, for which a document image is generated and adjusted until the new document image satisfactorily matches the original document image. In this manner, required segments with formatting information and text content are used to generate a new document image, and the formatting information may be iteratively adjusted until the new document image matches the original document image. However, any suitable means may be used for generating the new document image that matches the original document image. In some other implementations, the training module 160 includes a generative adversarial network (GAN). The GAN may include multiple neural networks that compete to generate a new document image that matches the original document image. In this manner, the neural networks are provided the segment information from the original document image, and the neural networks generate multiple candidates for a new document image. For example, each candidate may be based on a random, pseudo-random, structured (such as round robin), or other type of change in the document image from the other document images. In a specific example, a noise may be introduced into the formatting information for generating each candidate to attempt to randomly approach a new document image that matches the original document image. The noise may adjust spacing, layout, ordering or segments, or any other suitable portion of the formatting information. A discriminator for the neural networks may then select the candidate that best matches the original document image (such as based on pixel by pixel variations between the candidates and the original document image or another suitable means for comparison). The training module 160 also determines if the selected candidate satisfactorily matches the original document image (such as described above in determining if the new document image matches the original document image). If the candidate matches, the formatting information (such as inclusive of the noise to the formatting information) is stored. If the candidate does not match, the results of comparing the selected candidate to the original document image may be fed back into the neural networks, which may cause an adjustment to the noise used to generate the selected candidate. The process of generating multiple candidates, selecting the best candidate, and comparing the selected candidate to the original document image repeats until the selected candidate satisfactorily matches the original document image.

As shown above, training module 160 of the apparatus 100 (for clustering and identification of components or improvement of extraction for recreating document images) is machine learning based. For example, the apparatus 100 automatically reverse engineers document images from data structures, generates feedback for improving the extraction module 150 (or also the segmentation module 140), and adjusts the modules in order to improve the data structures determined for the document image and similar document images. Such a feedback system may also be used in determining that a new type of document image that is not associated with any template is received. For example, the matrix mapping segment locations in the document image does not match any matrix of the stored templates. In this manner, the apparatus 100 uses the feedback system to automatically determine a new type of document image is received and to automatically generate the rules for extracting formatting information and a new template (including some formatting information for common segments). The database 120 may thus be auto-populated with templates and sets of data structures to allow for automated management and manipulation of document images. In another example, the templates in the database 120 may be adjusted based on new component features to be measured, variations in clusters, and so on.

As used herein, a phrase referring to "at least one of" a list of items refers to any combination of those items, including single members. As an example, "at least one of: a, b, or c" is intended to cover: a, b, c, a-b, a-c, b-c, and a-b-c. The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for extracting information from a document image, the method comprising:
    segmenting a document image into multiple segments;
    determining formatting information for each segment, including:
        determining one or more features of the segment; and
        comparing the one or more features of the segment to one or more clusters of features associated with different document types, wherein the formatting information for the segment is based on the comparison;
    for each segment, storing the formatting information in a data structure associated with the segment;
    for each segment including text to be identified during information extraction:
        applying optical character recognition (OCR) to the segment to generate machine-encoded text; and
        storing the machine-encoded text in the associated data structure;
    generating a copy document image from the data structures;
    comparing the document image and the copy document image, wherein comparing the document image and the copy document image includes determining contrasts of corresponding pixels on a pixel-by-pixel basis, wherein the images not matching includes the number of corresponding pixels with a non-zero contrast between images being greater than a threshold of the total number of corresponding pixels; and
    in response to the images not matching, adjusting a determination of formatting information to be stored.

2. The method of claim 1, wherein determining the formatting information for each segment further includes:
comparing the one or more features of each segment of the document image to one or more clusters of features associated with different document types; and
determining the document type of the document image based on the comparisons, wherein the formatting information for the segment is based on the document type.

3. The method of claim 2, wherein the one or more clusters of features for different document types is generated by segmenting previous document images, determining segment features of the previous document images, and clustering the features by applying one or more transformations to the segment features of the previous document images, wherein the one or more transformations includes one or more of:
applying a logistic regression;
performing k-means clustering; or
applying a convolutional neural network.

4. The method of claim 1, wherein segmenting the document image includes:
determining a first group of pixels with non-zero contrasts and based on proximity between the first group of pixels;
determining a second group of pixels with non-zero contrasts and based on proximity between the second group of pixels, wherein the first group of pixels are separated from the second group of pixels by a pixel distance;
associating a first area of the document image including the first group of pixels and not including the second group of pixels with a first segment; and
associating a second area of the document image including the first group of pixels and not including the second group of pixels with a first segment.

5. The method of claim 1, wherein:
storing the formatting information in the associated data structure includes storing the formatting information in one or more cascading style sheets of the associated data structure; and
storing the machine-encoded text in the associated data structure includes storing the machine-encoded text in JavaScript Object Notation (JSON) format in the associated data structure.

6. The method of claim 1, further comprising iteratively adjusting the determination of formatting information for the document image, determining new formatting information for the document image based on the adjustment, generating a new copy document image based on the new formatting information, and comparing the new copy document image to the document image until the number of corresponding pixels with different contrasts between images is less than the threshold of the total number of corresponding pixels.

7. The method of claim 6, wherein adjusting the determination of formatting information is on a segment-by-segment basis.

8. An apparatus for extracting information from a document image, comprising:
one or more processors; and
a memory storing instructions that, when executed by the one or more processors, cause the apparatus to perform operations comprising:
segmenting a document image into multiple segments;
determining formatting information for each segment, including:
determining one or more features of the segment; and
comparing the one or more features of the segment to clusters of features associated with different document types, wherein the formatting information for the segment is based on the comparison;
for each segment, storing the formatting information in a data structure associated with the segment; and
for each segment including text to be identified during information extraction:
applying optical character recognition (OCR) to the segment to generate machine-encoded text; and
storing the machine-encoded text in the associated data structure;
generating a copy document image from the data structures;
comparing the document image and the copy document image, wherein comparing the document image and the copy document image includes determining contrasts of corresponding pixels on a pixel-by-pixel basis, wherein the images not matching includes the number of corresponding pixels with a non-zero contrast between images being greater than a threshold of the total number of corresponding pixels; and
in response to the images not matching, adjusting a determination of formatting information to be stored.

9. The apparatus of claim 8, wherein execution of the instructions to determine the formatting information for each segment further causes the apparatus to perform operations comprising:
comparing the one or more features of each segment of the document image to the one or more clusters of features associated with different document types; and
determining the document type of the document image based on the comparisons, wherein the formatting information for the segment is based on the document type.

10. The apparatus of claim 9, wherein the one or more clusters of features for different document types is generated by segmenting previous document images, determining segment features of the previous document images, and clustering the features by applying one or more transformations to the segment features of the previous document images, wherein the one or more transformations includes one or more of:
applying a logistic regression;
performing k-means clustering; or
applying a convolutional neural network.

11. The apparatus of claim 8, wherein execution of the instructions to segment the document causes the apparatus to perform operations comprising:
determining a first group of pixels with non-zero contrasts and based on proximity between the first group of pixels;
determining a second group of pixels with non-zero contrasts and based on proximity between the second group of pixels, wherein the first group of pixels are separated from the second group of pixels by a pixel distance;
associating a first area of the document image including the first group of pixels and not including the second group of pixels with a first segment; and
associating a second area of the document image including the first group of pixels and not including the second group of pixels with a first segment.

12. The apparatus of claim 8, wherein:
storing the formatting information in the associated data structure includes storing the formatting information in one or more cascading style sheets of the associated data structure; and
storing the machine-encoded text in the associated data structure includes storing the machine-encoded text in JavaScript Object Notation (JSON) format in the associated data structure.

13. The apparatus of claim 8, wherein execution of the instructions further causes the device to perform operations comprising iteratively adjusting the determination of formatting information for the document image, determining new formatting information for the document image based on the adjustment, generating a new copy document image based on the new formatting information, and comparing the new copy document image to the document image until the number of corresponding pixels with different contrasts between images is less than the threshold of the total number of corresponding pixels.

14. The apparatus of claim 13, wherein adjusting the determination of formatting information is on a segment-by-segment basis.

15. A non-transitory computer-readable storage medium storing instructions that, when executed by one or more processors of an apparatus, cause the apparatus to perform operations comprising:
segmenting a document image into multiple segments;
determining formatting information for each segment, including:
determining one or more features of the segment; and
comparing the one or more features of the segment to clusters of features associated with different document types, wherein the formatting information for the segment is based on the comparison;
for each segment, storing the formatting information in a data structure associated with the segment; and
for each segment including text to be identified during information extraction:
applying optical character recognition (OCR) to the segment to generate machine-encoded text; and
storing the machine-encoded text in the associated data structure;
generating a copy document image from the data structure;
comparing the document image and the copy document image, wherein comparing the document image and the copy document image includes determining contrasts of corresponding pixels on a pixel-by-pixel basis, wherein the images not matching includes the number of corresponding pixels with a non-zero contrast between images being greater than a threshold of the total number of corresponding pixels; and
in response to the images not matching, adjusting a determination of formatting information to be stored.

\* \* \* \* \*